(12) United States Patent
Kitaoka et al.

(10) Patent No.: US 7,395,023 B2
(45) Date of Patent: Jul. 1, 2008

(54) IMAGE FORMING APPARATUS

(75) Inventors: Yoshitaka Kitaoka, Osaka (JP); Noriyuki Tajima, Hirakata (JP); Atsushi Sogami, Sanda (JP); Hiroshi Terada, Ikoma (JP); Yuzo Kawano, Ogori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 303 days.

(21) Appl. No.: 11/100,418

(22) Filed: Apr. 7, 2005

(65) Prior Publication Data
US 2005/0238397 A1 Oct. 27, 2005

(30) Foreign Application Priority Data
Apr. 20, 2004 (JP) ............................. 2004-124750

(51) Int. Cl.
*G03G 15/00* (2006.01)
(52) U.S. Cl. ................. 399/361; 399/363; 399/377; 399/405
(58) Field of Classification Search ................ None
See application file for complete search history.

(56) References Cited

U.S. PATENT DOCUMENTS

| | | | | |
|---|---|---|---|---|
| 5,881,351 | A * | 3/1999 | Shimotoso et al. | 399/377 |
| 6,246,493 | B1 | 6/2001 | Uchiyama et al. | |
| 6,304,742 | B1 * | 10/2001 | Nunes et al. | 399/361 |
| 6,307,621 | B1 | 10/2001 | Endo et al. | |
| 6,522,862 | B2 * | 2/2003 | Koshimizu et al. | 399/405 |
| 6,526,255 | B2 | 2/2003 | Itoh et al. | |
| 6,598,873 | B2 | 7/2003 | Takisawa et al. | |
| 6,731,903 | B2 * | 5/2004 | Suzuki | 399/361 |
| 2002/0041402 | A1 | 4/2002 | Hatano | |
| 2003/0169447 | A1 | 9/2003 | Nakadaira | |
| 2004/0052563 | A1 | 3/2004 | Hayamizu et al. | |

FOREIGN PATENT DOCUMENTS

| | | |
|---|---|---|
| JP | 5-147802 | 6/1993 |
| JP | 2001-215759 | 8/2001 |
| JP | 2003-307996 | 10/2003 |

OTHER PUBLICATIONS

English language abstract of JP 2003-307996.
English language abstract of JP 2001-215759.
English language abstract of JP 5-147802, (1993).

* cited by examiner

*Primary Examiner*—Daniel J. Colilla
*Assistant Examiner*—'Wynn' Q Ha
(74) *Attorney, Agent, or Firm*—Greenblum & Bernstein, P.L.C.

(57) ABSTRACT

The present invention holds the source document feeding direction downstream edge of a printed sheet ejected above a source document feed tray by means of a top ejection platform functioning as a printed sheet holding section in an area apart from source document feed rollers functioning as a source document feeding section. As a result, a printed sheet ejected onto top ejection platform is not fed automatically by source document feed rollers. Therefore, a printed sheet that has undergone image formation can be ejected without obstruction above source document feed tray of an automatic document feeder, checking and removal of a printed sheet are facilitated, and convenience is improved.

3 Claims, 9 Drawing Sheets

IMAGE FORMING APPARATUS

BACKGROUND OF THE INVENTION

1. Field of the Invention

The present invention relates to an image forming apparatus, and more particularly to an image forming apparatus useful for employment in a copier, printer, or facsimile incorporating an automatic document feeder that performs automatic feeding of source documents, and a multifunctional composite apparatus that integrates these machines.

2. Description of the Related Art

In line with the digitalization of text data and image data in recent years, by far the most frequent kind of printout by multifunctional image forming apparatuses of this kind used in general offices and so forth is that of electronic data transmitted from a PC, FAX, or similar device.

While the trend is for the frequency of such electronic data printout to continue to increase among multifunctional image forming apparatuses of this kind, the copying of paper documents, book source documents, and the like is also necessary from time to time, and therefore a reading section for reading these source documents is also provided in these apparatuses.

With a conventional image forming apparatus of this kind, a source document holding platform and operation panel are generally positioned on the top of the main body of the apparatus to improve operability, and a sheet ejection tray of a sheet ejection section that holds a printed sheet that has undergone image formation is positioned so as to project at the side of the main body of the apparatus. Consequently, with this kind of image forming apparatus, an area for the projection of the sheet ejection tray is necessary at the side of the main body of the apparatus, and the required footprint (installation area) is larger than it appears.

For this reason, in recent years an image forming apparatus has been proposed that has a configuration whereby a space is formed in the waist section of the main body of the apparatus between the reading section positioned on the top of the main body of the apparatus and an image forming section positioned below this reading section, and an ejection section is formed in this space in the waist section of the main body of the apparatus (see, for example, Unexamined Japanese Patent Publication No. 2003-307996 (hereinafter referred to as patent document 1)).

An advantage of this image forming apparatus is that, since a printed sheet on which an image has been formed, fed from a feeding section below the image forming section, is ejected into an ejection section positioned in a space in the waist section of the main body of the apparatus, the footprint can be kept small.

However, while the footprint of an image forming apparatus with this kind of configuration can be kept small, there is an essential irrationality in the configuration in that it is awkward to check and remove a printed sheet that has undergone image formation because there is an operation panel operated by the user and a reading section above the ejection section.

That is to say, the image forming apparatus described in patent document 1 has a configuration such that a printed sheet that has undergone image formation, ejected into and held in the ejection section positioned in the waist section of the main body of the apparatus, is hidden behind the reading section, the operation panel on the front of the main body of the apparatus, or the like.

Consequently, with this image forming apparatus, it is difficult to check the state of a printed sheet that has undergone image formation by means of electronic data from a PC or the like for which image forming frequency is higher than for copying of paper documents, book source documents, or the like. Also, the configuration makes it difficult to remove an ejected printed sheet from the ejection section. Furthermore, with this image forming apparatus, since the ejection section is formed in a space in the waist section of the main body of the apparatus, the housing structure and exterior configuration are complicated. Moreover, with this image forming apparatus, it is necessary to form a large ejection section space in order to facilitate handling of printed sheets on which electronic data has been printed out from a PC or the like with a high image forming frequency as described above. Consequently, extra costs are necessary in order to maintain the strength of the main body of the apparatus, and so forth.

It is thus desirable for an image forming apparatus of this kind to have a configuration that allows the footprint of the main body of the apparatus to be kept small while also facilitating checking and removal of a printed sheet that has undergone image formation. An image forming apparatus in which the ejection section for a printed sheet that has undergone image formation is positioned above the source document placement section of the reading section is known as an image forming apparatus that meets this requirement (see, for example, Unexamined Japanese Patent Publication No. 2001-215759 (hereinafter referred to as patent document 2)).

In the image forming apparatus described in this patent document 2, a printed sheet that has undergone image formation is ejected onto the uppermost part of the main body of the apparatus, enabling the footprint of the main body of the apparatus to be made small while allowing checking and removal of a printed sheet that has undergone image formation to be performed easily.

However, in the case of the image forming apparatus described in patent document 2, a printed sheet that has undergone image formation is ejected onto a source document holding platform (contact glass) on which a source document to be copied is placed manually by the user. Therefore, this image forming apparatus has a configuration such that, when an automatic document feeder that feeds source documents automatically is positioned above this source document holding platform, a printed sheet that has undergone image formation is ejected below the source document feed tray and source document ejection tray of the automatic document feeder.

Consequently, with this image forming apparatus, when an automatic document feeder is provided a printed sheet that has undergone image formation is hidden beneath the source document feed tray and source document ejection tray, as in the case of the image forming apparatus of patent document 1. The configuration is thus inconvenient from the standpoint of checking and removing printed sheets.

Thus, in the image forming apparatus described in patent document 2, the source document feed tray and source document ejection tray are positioned slantwise, facilitating checking and removal of an ejected printed sheet. However, with an image forming apparatus having this kind of a configuration, the main body of the apparatus tends to be large, and the opening/closing trajectories of the source document feed tray and source document ejection tray of the automatic document feeder are wide, increasing the space occupied around the main body of the apparatus.

Therefore, in the case of an image forming apparatus equipped with an automatic document feeder, it is desirable for a printed sheet to be ejected above the source document feed tray. However, if this is done, a printed sheet will be ejected on top of a feed source document placed on the source document feed tray, resulting in the problem of an ejected printed sheet being automatically fed by the source document feeding section of the automatic document feeder.

SUMMARY OF THE INVENTION

It is an object of the present invention to provide a highly convenient image forming apparatus that enables a printed sheet that has undergone image formation to be ejected without obstruction above a source document feed tray of an automatic document feeder.

The present invention enables a printed sheet ejected above the source document feed tray of an automatic document feeder positioned on the upper part of the main body of the apparatus to be held in an area apart from the source document feeding section.

By this means, a printed sheet that has undergone image formation can be ejected without obstruction above the source document feed tray of an automatic document feeder.

BRIEF DESCRIPTION OF THE SEVERAL VIEWS OF DRAWINGS

The above and other objects and features of the invention will appear more fully hereinafter from a consideration of the following description taken in conjunction with the accompanying drawing wherein one example is illustrated by way of example.

DETAILED DESCRIPTION OF THE PREFERRED EMBODIMENTS

Figure 1:
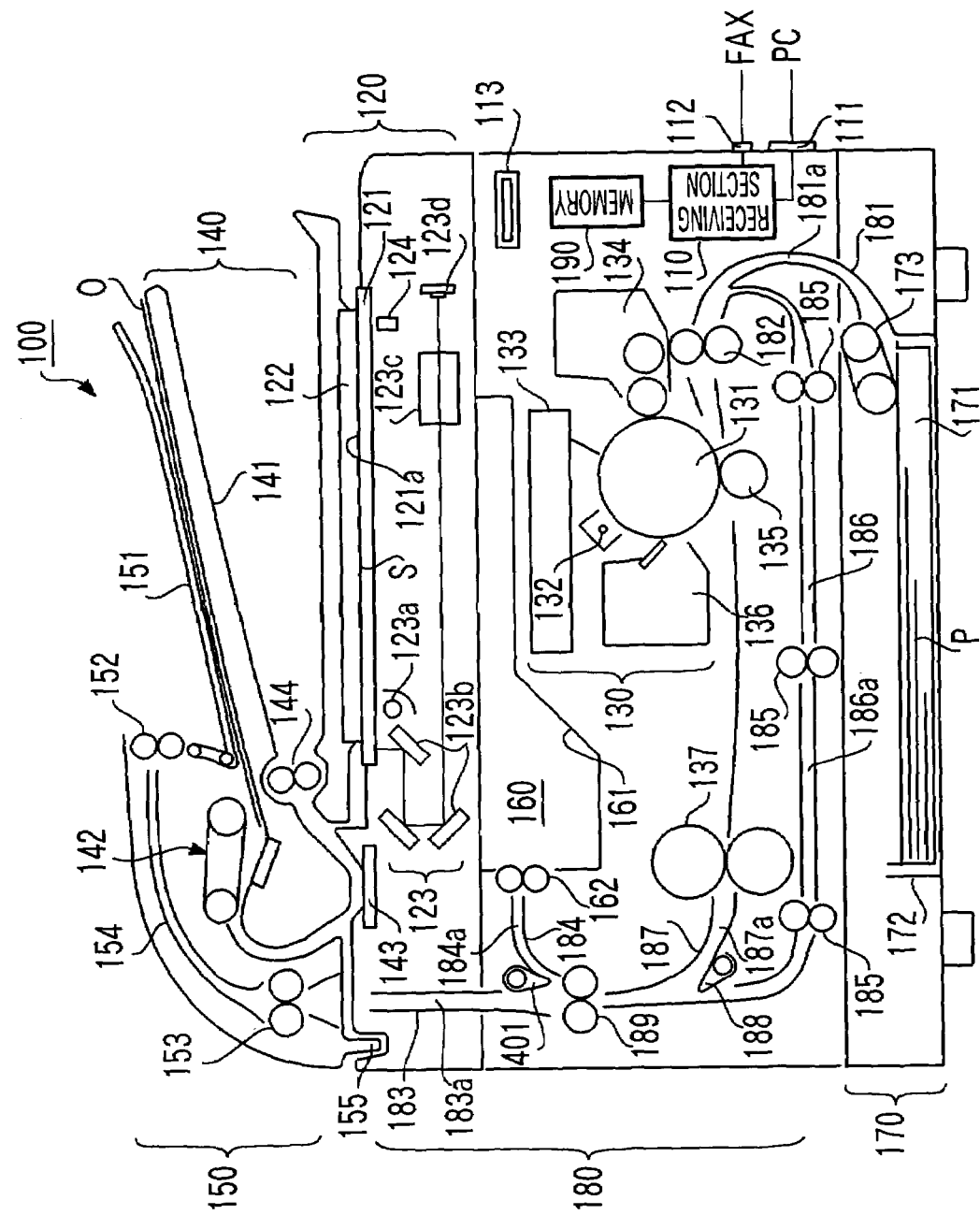
FIG. 1 is a schematic cross-sectional drawing showing the overall configuration of an image forming apparatus according to Embodiment 1 of the present invention.

With reference now to the accompanying drawings, embodiments of the present invention will be explained in detail below. In the drawings, configuration elements and equivalent parts that have identical configurations or function are assigned the same codes, and descriptions thereof are not repeated.

Embodiment 1

FIG. 1 is a schematic cross-sectional drawing showing the overall configuration of an image forming apparatus according to Embodiment 1 of the present invention. An image forming apparatus according to Embodiment 1 has a configuration as a multifunctional composite machine having a copying function that copies paper documents, book source documents, and so forth, a print function that prints out electronic data and so forth transmitted from a PC or the like, a facsimile function that transmits and receives to/from a FAX or the like, and so forth.

That is to say, as shown in FIG. 1, this image forming apparatus 100 includes a receiving section 110, a reading section 120, an image forming section 130, an automatic document feeder 140, a top ejection section 150, a main body ejection section 160, a feeding section 170, a transporting system 180, and so forth.

Receiving section 110 receives image information input from an external device such as a PC, FAX, or storage medium (memory card) via a LAN (including a wireless LAN) or public circuit. Image forming apparatus 100 is equipped with a LAN port 111 to which a LAN cable is connected, a modular connector 112 to which a public circuit is connected, and a card slot 113 into which a memory card is inserted.

Reading section 120 is composed of a source document holding platform (contact glass) 121 on which a sheet source document S (or book source document BO described later herein) to be copied is placed manually by the user, a source document cover 122 that covers sheet source document S (or book source document BO) placed on a source document holding surface 121a of source document holding platform 121, a scanning optical system 123 that scans and reads an image of sheet source document S, and so forth. Scanning optical system 123 of this example is composed of a light source 123a, mirrors 123b, a lens 123c, an image pickup device (CCD) 123d, and so forth. Source document cover 122 has a configuration combining a source document ejection tray of automatic document feeder 140 described later herein.

Image forming section 130 is composed of a photosensitive body 131, an electrifier 132, an exposure apparatus 133, a developing apparatus 134, a transfer roller 135, a cleaning apparatus 136, a fixing apparatus 137, and so forth.

Automatic document feeder 140 is composed of a source document feed tray 141 in which feed source documents O to be automatically fed are set, source document feed rollers 142 as a source document feeding section that separates and feeds set feed source documents O one by one, a scanner 143 that reads an image of a separated and fed feed source document O, source document ejection rollers 144 that eject a feed source document O for which image reading has been completed, and so forth. Automatic document feeder 140 of this example is configured so that a feed source document O is ejected onto the top of source document cover 122 by means of source document ejection rollers 144. Automatic document feeder 140 of this example is configured so as to open and close freely with respect to the main body of the apparatus together with source document cover 122.

Top ejection section 150 is equipped with a top ejection platform 151 as a printed sheet holding section that holds a printed sheet Ps that has undergone image formation described later herein. This top ejection platform 151 is configured so as to hold the source document feeding direction downstream edge of a printed sheet Ps ejected thereupon in an area apart from the source document feeding section. Top ejection section 150 includes top ejection rollers 152 that eject a printed sheet Ps that has undergone image formation onto top ejection platform 151, top transport rollers 153 that transport a printed sheet Ps that has undergone image formation toward top ejection rollers 152, and top ejection guide plates 154 that guide a printed sheet Ps that has undergone image formation transported toward top ejection rollers 152 by top transport rollers 153. Top ejection section 150 of this example is structurally integral with automatic document feeder 140.

Main body ejection section 160 includes a main body ejection platform 161 positioned in a main body area of image forming apparatus 100 different from top ejection section 150 that holds a printed sheet Ps that has undergone image formation, and main body ejection rollers 162 that eject a printed sheet Ps that has undergone image formation onto main body ejection platform 161. As shown in FIG. 1, main body ejection section 160 of image forming apparatus 100 according to Embodiment 1 is positioned in a space formed in the waist section of the main body of the apparatus between reading section 120 and image forming section 130.

Feeding section 170 is composed of a cassette housing section 172 for holding a paper feed cassette 171 containing recording paper P, a separating and feeding apparatus 173 that separates and feeds individual sheets of recording paper P held in paper feed cassette 171, and so forth.

Transporting system 180 is equipped with feed guide plates 181 that guide recording paper P from feeding section 170 toward image forming section 130. A feed path 181*a* is formed by these feed guide plates 181. At the exit of this feed path 181*a* are positioned registration rollers 182 that transport recording paper P to image forming section 130 at predetermined timing.

Transporting system 180 is also equipped with top ejection guide plates 183 that guide a printed sheet Ps ejected from fixing apparatus 137 of image forming section 130 toward top ejection section 150. A top ejection path 183*a* is formed by these top ejection guide plates 183.

Transporting system 180 is also equipped with main body ejection guide plates 184 that guide a printed sheet Ps ejected from fixing apparatus 137 of image forming section 130 toward main body ejection section 160. A main body ejection path 184*a* is formed by these main body ejection guide plates 184.

Here, an ejection mode in which a printed sheet Ps ejected from fixing apparatus 137 of image forming section 130 is ejected toward top ejection section 150 via top ejection path 183*a* is called top ejection mode, and an ejection mode in which a printed sheet Ps ejected from fixing apparatus 137 of image forming section 130 is ejected toward main body ejection section 160 via main body ejection path 184*a* is called main body ejection mode.

Figure 4:
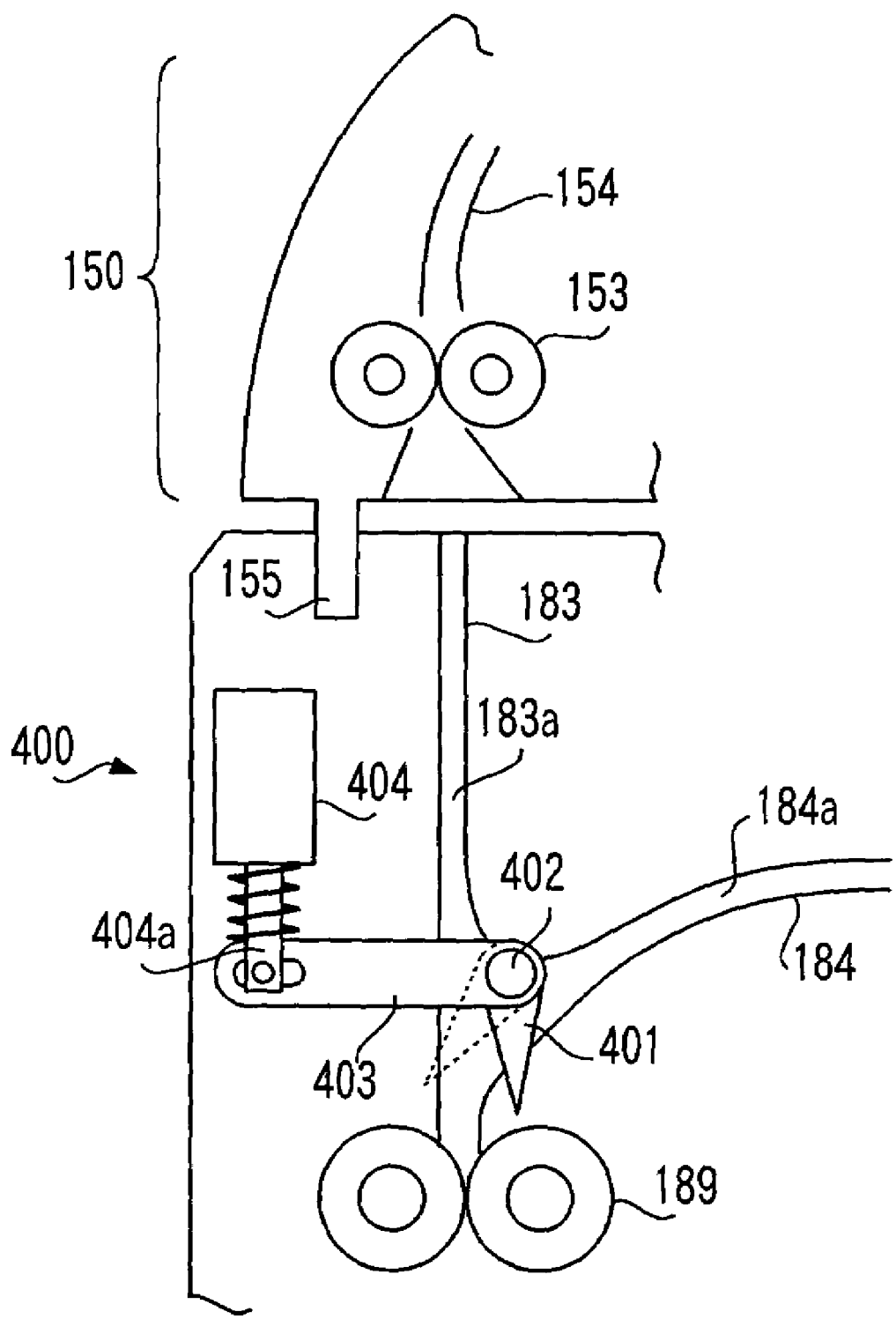
FIG. 4 is a schematic configuration diagram showing one example of the ejection mode switching section of an image forming apparatus according to Embodiment 1.

At the branch of top ejection path 183*a* and main body ejection path 184*a* is positioned an ejection path switching lug 401 of an ejection mode switching section 400 that switches between top ejection mode and main body ejection mode (see FIG. 4).

Transporting system 180 also has reverse transport rollers 185 that transport a printed sheet Ps that has undergone image formation to feed path 181*a* with its image formation surface reversed, and a reverse transport path 186*a* formed by reverse transport guide plates 186.

At the confluence of this reverse transport path 186*a* and an ejection transport path 187*a* formed by ejection guide plates 187 that guide a printed sheet Ps ejected from fixing apparatus 137 of image forming section 130 is positioned a reverse switching lug 188 that switches the transport path of a printed sheet Ps that has temporarily left ejection transport path 187*a* toward reverse transport path 186*a*.

On the ejection direction upstream side of ejection path switching lug 401 are positioned forward/reverse rollers 189 that transport a printed sheet Ps in the ejection direction or reverse transportation direction.

Next, the operation of an image forming apparatus according to Embodiment 1 will be described.

This image forming apparatus 100 has three print modes: a manual copying mode, an automatic copying mode, and an external input print mode.

Manual copying mode is a print mode in which a sheet source document S or book source document BO placed on source document holding surface 121*a* is copied by means of image information read by CCD 123*d* of reading section 120.

Automatic copying mode is a print mode in which a feed source document O set on source document feed tray 141 is copied by means of image information read by scanner 143 of automatic document feeder 140.

External input print mode is a print mode in which printout is performed by means of image information from an external device such as a PC, FAX, or memory card, input to receiving section 110.

Figure 2:
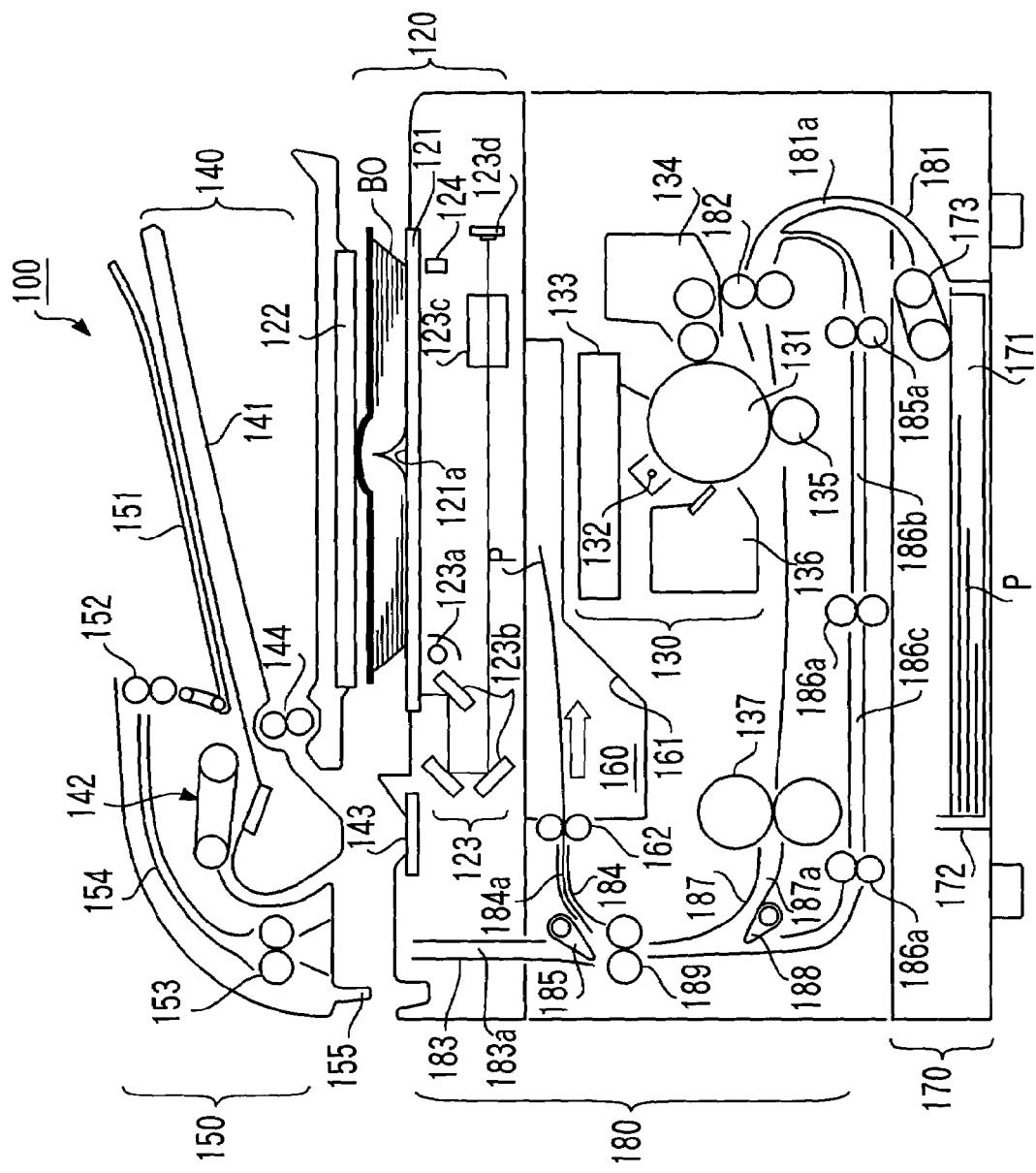
FIG. 2 is a schematic cross-sectional drawing showing the overall configuration for explaining the operating situation in the manual copying mode of an image forming apparatus according to Embodiment 1.

In manual copying mode, as shown in FIG. 2, source document cover 122 of reading section 120 is first opened together with automatic document feeder 140, exposing source document holding surface 121*a* of source document holding platform 121. Then the user manually places a source document (here, a book source document BO) to be copied on this exposed source document holding surface 121*a*.

Reading section 120 has a source document size sensor 124 as a manual source document detection device that detects the presence of a sheet source document S or book source document BO placed on source document holding platform 121. That is to say, in this image forming apparatus 100, the presence or absence of a sheet source document S or book source document BO is detected by whether or not source document size sensor 124 detects the size of a source document placed on source document holding surface 121*a* and outputs a detection signal.

In FIG. 2, when the user presses the Copy button on an operation panel (not shown) of the main body of the apparatus while it is detected by source document size sensor 124 that a book source document BO has been placed on source document holding surface 121*a*, scanning optical system 123 operates and book source document BO image data is read by CCD 123*d*. Book source document BO image data read by this CCD 123*d* is converted to print data by an image processing apparatus (not shown), and then input to exposure apparatus 133 at predetermined timing.

Meanwhile, as a result of pressing the Copy button, photosensitive body 131 rotates in the predetermined direction, and the surface of photosensitive body 131 is charged uniformly by electrifier 132. Exposure apparatus 133 irradiates the surface of this uniformly charged photosensitive body 131 with print data converted by the image processing apparatus as a laser beam. By means of this laser irradiation, an electrostatic latent image of book source document BO is formed on the surface of photosensitive body 131.

This electrostatic latent image is made into a visible image (a toner image) by means of toner supplied from developing apparatus 134. This toner image is then transferred by transfer roller 135 to recording paper P fed by registration rollers 182, and then fixed onto recording paper P by fixing apparatus 137.

A printed sheet Ps on which the image of book source document BO has been formed in this way passes along main body ejection path 184*a* and is ejected and placed onto main body ejection platform 161 of main body ejection section 160 by main body ejection rollers 162 as shown by the solid line in FIG. 2.

Figure 3:
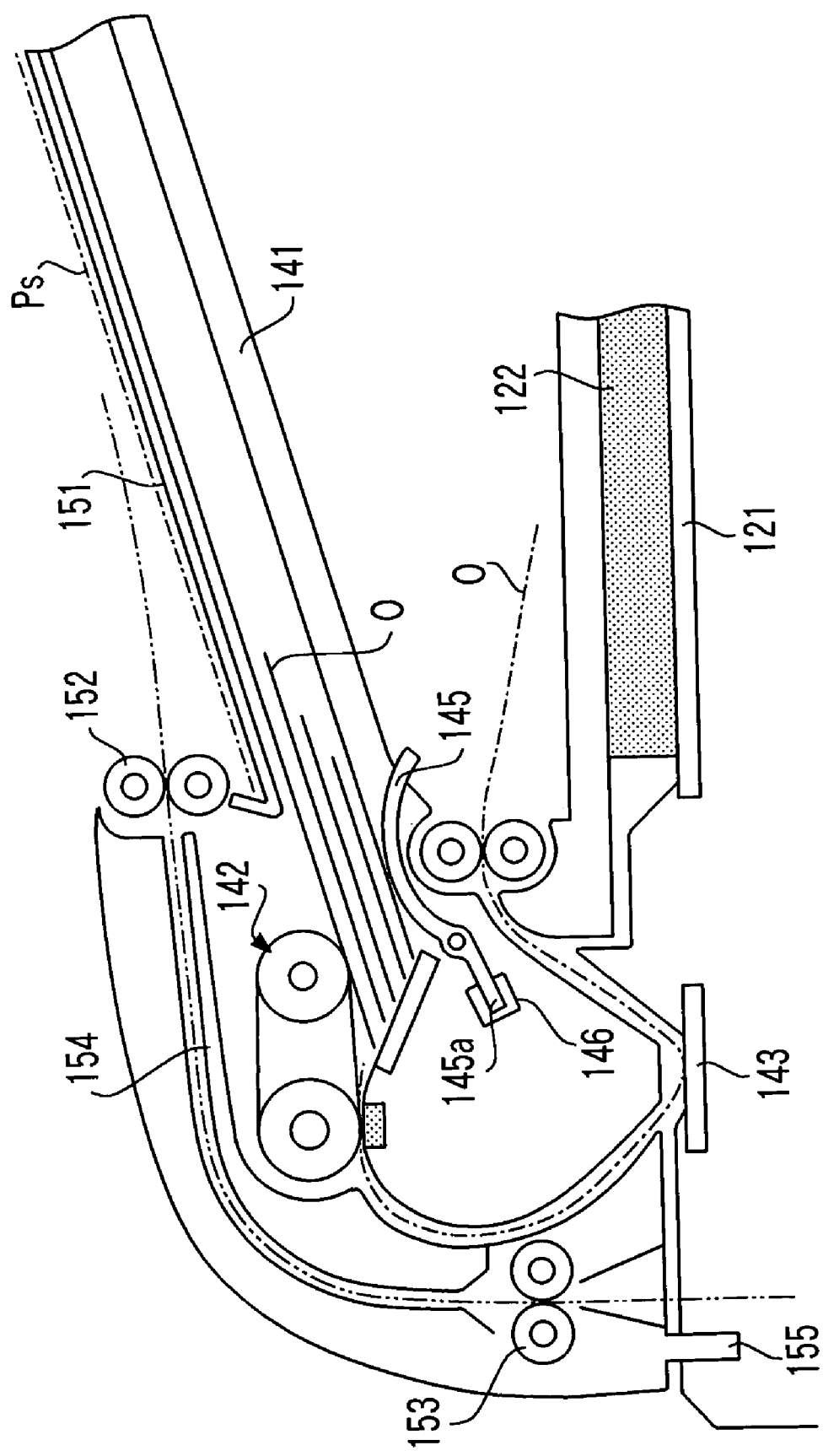
FIG. 3 is a schematic cross-sectional drawing showing the configuration of an automatic document feeder for explaining the operating situation in the automatic copying mode of an image forming apparatus according to Embodiment 1.

In automatic copying mode, when feed source documents O to be fed automatically are set on source document feed tray 141 of automatic document feeder 140, as shown in FIG. 3, an actuator 145 attached to source document feed tray 141 so as to be able to swing freely is pressed against feed source documents O and swings in a clockwise direction. Through the swinging of this actuator 145, a feed source document sensor 146 functioning as a feed source document detection device that detects the presence of a feed source document O to be fed by automatic document feeder 140 is turned on.

Feed source document sensor 146 in this example is composed of a light emitting element and a photoreceptor element, and is configured so as to be turned on and off by the advance or retreat of swinging end 145a of actuator 145 with respect to the light path between the two elements. When feed source document sensor 146 is turned on, preparation for light emission by the lamp of scanner 143 that reads feed source document O image information, and so forth, is performed.

When the user presses the Copy button on the operation panel on the main body of the apparatus while feed source document sensor 146 is on, a feed source document O on source document feed tray 141 is fed automatically as shown by the dot-dash line in FIG. 3. By this means, feed source document O is transported while being held in close contact with the source document reading glass of scanner 143, and the feed source document O image is read. When feed source document O has been read, it is ejected by source document ejection rollers 144 onto the top of source document cover 122 also serving as the source document ejection tray of automatic document feeder 140.

Image information (image data) of feed source document O read by scanner 143 of automatic document feeder 140 in this way is stored (accumulated) in memory 190 functioning as a storage device located inside the main body of the apparatus (see FIG. 1). Image data stored (accumulated) in memory 190 is converted to print data by an image processing apparatus (not shown) and input to exposure apparatus 133 at predetermined timing.

The surface of uniformly charged photosensitive body 131 is irradiated with the print data input to exposure apparatus 133 as a laser beam at predetermined timing, and the print data is fixed onto recording paper P as a toner image by fixing apparatus 137.

In this automatic copying mode, a printed sheet Ps that has undergone image formation ejected from fixing apparatus 137 is transported toward top ejection section 150 via top ejection path 183a. This printed sheet Ps is transported along top ejection guide plates 154 by top transport rollers 153 as shown by the dot-dot-dash line in FIG. 3, and is ejected and placed onto top ejection platform 151 positioned on the top part of source document feed tray 141 by top ejection rollers 152.

In external input print mode, image information (image data) input to receiving section 110 from an external device such as a PC, FAX, or memory card is stored in memory 190 provided as a storage device located in the main body of the apparatus in the same way as in automatic copying mode. Image data stored in this memory 190 is converted to print data by an image processing apparatus (not shown) and input to exposure apparatus 133 at predetermined timing.

Also, in this external input print mode, as in the case of automatic copying mode, a printed sheet Ps that has undergone image formation ejected from fixing apparatus 137 is transported toward top ejection section 150 via top ejection path 183a, and is ejected and placed onto top ejection platform 151 by top ejection rollers 152.

In this image forming apparatus 100, in manual copying mode a printed sheet Ps that has undergone image formation passes along main body ejection path 184a and is ejected and placed onto main body ejection platform 161 of main body ejection section 160 by main body ejection rollers 162 as shown by the solid line in FIG. 2.

In automatic copying mode and external input print mode, on the other hand, a printed sheet Ps that has undergone image formation passes along top ejection path 183a and is ejected and placed onto top ejection platform 151 of top ejection section 150 by top ejection rollers 152 as shown by the dot-dot-dash line in FIG. 3.

That is to say, in this image forming apparatus 100, a printed sheet Ps that has undergone image formation in automatic copying mode or external input print mode, which have a high image formation frequency, is ejected by top ejection section 150 positioned on the top of the main body of the apparatus by means of top ejection mode.

Therefore, with this image forming apparatus 100, a printed sheet Ps with a high image formation frequency of this kind can easily be checked and removed, and convenience is improved.

Also, in manual copying mode, a printed sheet Ps that has undergone image formation by means of image information from reading section 120 is ejected onto main body ejection platform 161 of main body ejection section 160, which is not affected by manipulation of a sheet source document S or book source document BO placed on source document holding platform 121 (a source document cover 122 operating/closing operation) in main body ejection mode.

Therefore, with this image forming apparatus 100, there is no tendency to complicate the ejection path, or reduce the layout flexibility, of a printed sheet Ps that has undergone image formation in manual copying mode.

Here, switching between printed sheet Ps top ejection path 183a in top ejection mode and printed sheet Ps main body ejection path 184a in main body ejection mode is performed by means of above-described ejection path switching lug 401 of ejection mode switching section 400.

FIG. 4 is a schematic configuration diagram showing one example of ejection mode switching section 400 of this image forming apparatus 100. As shown in FIG. 4, ejection path switching lug 401 of ejection mode switching section 400 is attached to a spindle 402 pivoted at the branch of top ejection path 183a and main body ejection path 184a of the main body of the apparatus.

A switching arm 403 is attached to spindle 402. This switching arm 403 and ejection path switching lug 401 are configured integrally via spindle 402. The free end of switching arm 403 is connected in freely swinging fashion to an actuator 404a of a switching solenoid 404 provided in the main body of the apparatus.

When the print mode of image forming apparatus 100 is automatic copying mode or external input print mode, switching solenoid 404 is in the off state (normal state). When this switching solenoid 404 is in the off state, ejection path switching lug 401 moves to a position in which top ejection path 183a is opened, as shown by the solid line in FIG. 4, and the printed sheet Ps ejection mode is switched to the top ejection mode shown in FIG. 1.

On the other hand, when the print mode of image forming apparatus 100 is manual copying mode, switching solenoid 404 is in the on state (excited state). That is to say, switching solenoid 404 of this example goes to the on state when source document size sensor 124 of reading section 120 detects a sheet source document S or book source document BO placed on source document holding platform 121 and outputs a detection signal. When switching solenoid 404 is in the on state, ejection path switching lug 401 moves to a position in which main body ejection path 184*a* is opened, as shown by the dotted line in FIG. 4, and the printed sheet Ps ejection mode is switched to the main body ejection mode shown in FIG. 2.

In this image forming apparatus 100, as shown in FIG. 3, the source document feeding direction downstream edge of a printed sheet Ps ejected above source document feed tray 141 is held in an area apart from the source document feeding section by means of top ejection platform 151 functioning as a printed sheet holding section. Therefore, with this image forming apparatus 100, a printed sheet Ps ejected onto top ejection platform 151 is not automatically fed by source document feed rollers 142 of the source document feeding section.

Therefore, in this image forming apparatus 100, a printed sheet Ps that has undergone image formation can be ejected without obstruction above source document feed tray 141 of automatic document feeder 140, as a result of which checking and removal of printed sheet Ps are facilitated and convenience is improved.

Also, this image forming apparatus 100 is configured so that a printed sheet Ps that has undergone image formation is ejected above source document feed tray 141 from the source document feeding direction downstream side. Therefore, according to this image forming apparatus 100, top ejection section 150 and the automatic document feeder 140 source document feeding section are located on the same side of the main body of the apparatus, enabling the top ejection section 150 drive system and source document feeding section drive system to be combined into a single drive system, and so allowing the apparatus to be made more compact.

Embodiment 2

Next, an image forming apparatus according to Embodiment 2 of the present invention will be described.

Figure 5:
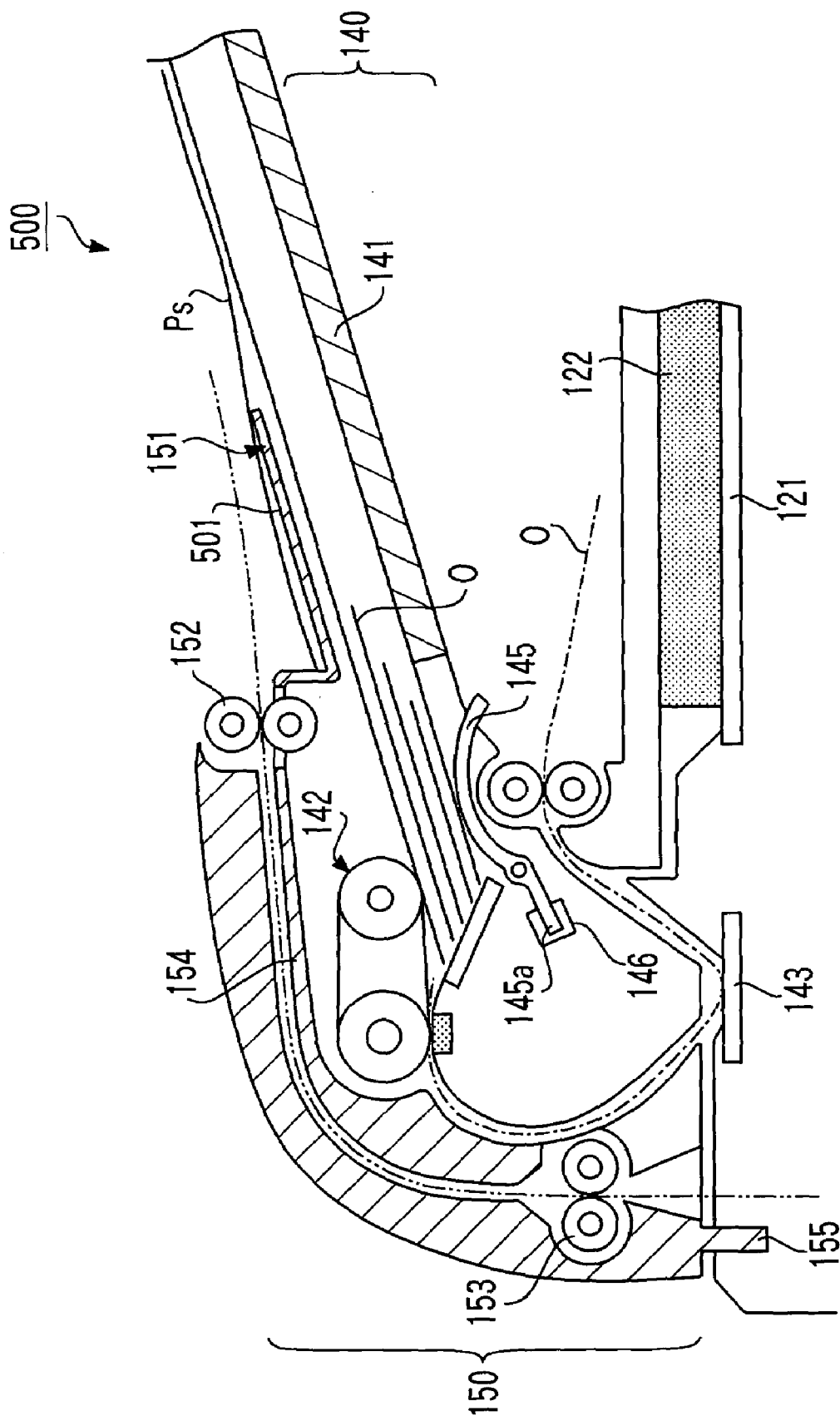
FIG. 5 is a schematic cross-sectional drawing showing the configuration of the top part of an image forming apparatus according to Embodiment 2.

FIG. 5 is a schematic cross-sectional drawing showing the configuration of the top part of an image forming apparatus according to Embodiment 2.

As shown in FIG. 5, in this image forming apparatus 500, top ejection platform 151 functioning as the printed sheet holding section thereof comprises an extension end 501 formed by extending the end of top ejection guide plate 154 that guides a printed sheet Ps ejected above source document feed tray 141.

Here, top ejection guide plate 154 in this image forming apparatus 500 is made short so that the source document feeding direction downstream edge only of a printed sheet Ps ejected above source document feed tray 141 is held in an area apart from the source document feeding section. This is to enable placement of a feed source document O onto source document feed tray 141 or removal of a jammed source document to be carried out easily.

Thus, image forming apparatus 500 according to Embodiment 2 enables top ejection platform 151 functioning as a printed sheet holding section to be formed simply by extending the end of a top ejection guide plate 154, making it possible to provide top ejection platform 151 without incurring any cost.

Other configuration elements and operations in image forming apparatus 500 of this example are similar to configuration elements and operations of image forming apparatus 100 according to Embodiment 1, and therefore descriptions thereof are omitted here.

Embodiment 3

Next, an image forming apparatus according to Embodiment 3 of the present invention will be described.

Figure 6:
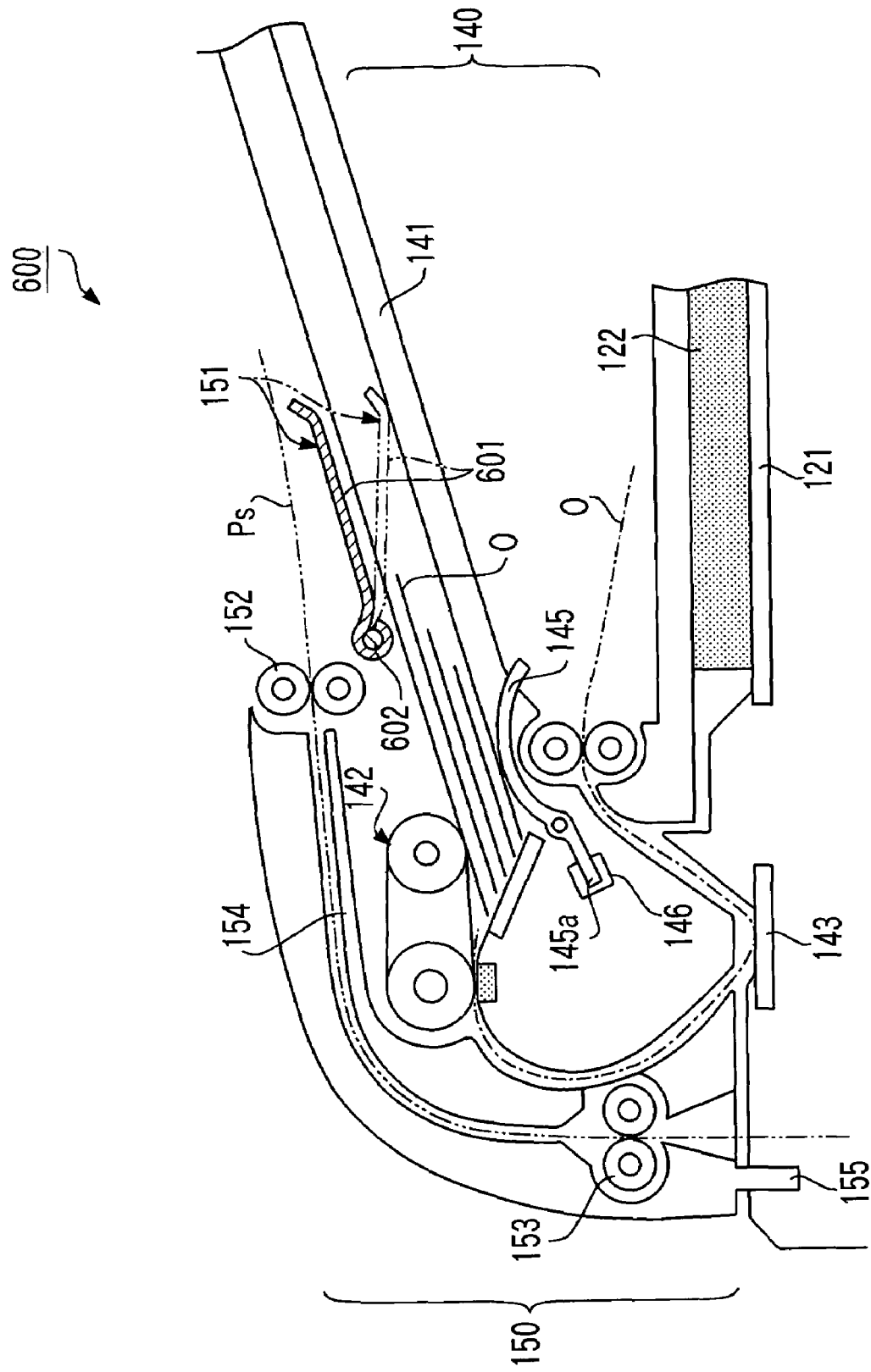
FIG. 6 is a schematic cross-sectional drawing showing the configuration of the top part of an image forming apparatus according to Embodiment 3.

FIG. 6 is a schematic cross-sectional drawing showing the configuration of the top part of an image forming apparatus according to Embodiment 3.

As shown in FIG. 6, in this image forming apparatus 600, top ejection platform 151 functioning as the printed sheet holding section thereof comprises a swinging member 601 whose free end swings under its own weight and comes into contact with the top of a feed source document O placed on source document feed tray 141.

In FIG. 6, swinging member 601 functioning as top ejection platform 151 is pivoted in a freely swinging manner by means of a spindle 602 attached to side plates (not shown) of automatic document feeder 140, and when a feed source document O is placed on source document feed tray 141, the free end thereof swings under its own weight and comes into contact with the top of feed source document O.

In this image forming apparatus 600, as feed source documents O held on source document feed tray 141 decrease in number due to source document feeding, swinging member 601 swings as shown by the dot-dot-dash line in FIG. 6 and the printed sheet Ps holding surface thereof (the top of swinging member 601) moves downward.

Therefore, with this image forming apparatus 600, a greater number of printed sheets Ps can be ejected and held at one time without changing the position of top ejection section 150—that is, the position of top ejection rollers 152 that eject printed sheets Ps.

Also, with this image forming apparatus 600, swinging member 601 can be opened and closed with respect to source document feed tray 141, enabling placement of a feed source document O in source document feed tray 141 or removal of a jammed source document to be carried out easily even if swinging member 601 is not made short.

Other configuration elements and operations in image forming apparatus 600 of this example are similar to configuration elements and operations of image forming apparatus 100 according to Embodiment 1, and therefore descriptions thereof are omitted here.

Embodiment 4

Next, an image forming apparatus according to Embodiment 4 of the present invention will be described.

Figure 7:
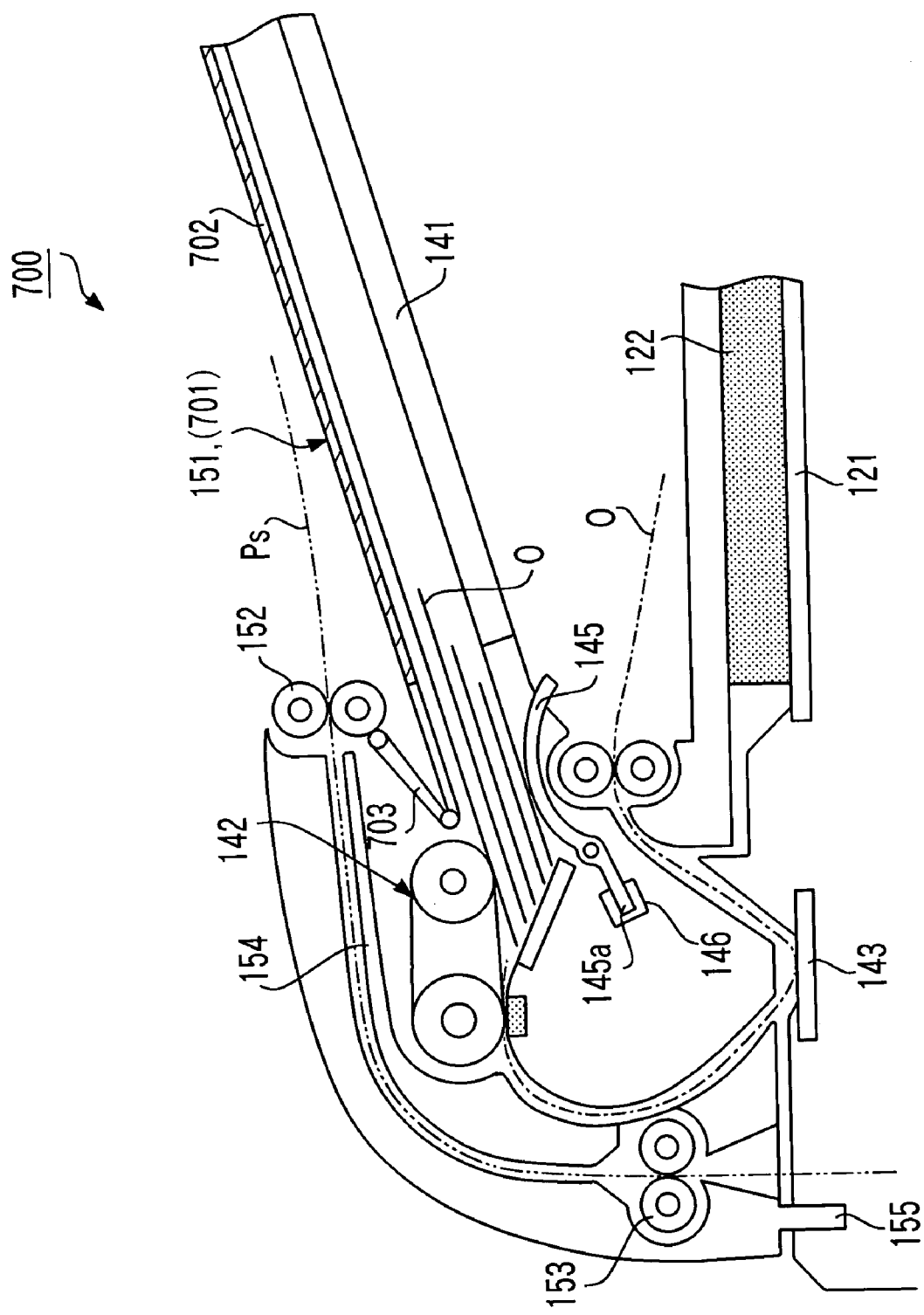
FIG. 7 is a schematic cross-sectional drawing showing the configuration of the top part of an image forming apparatus according to Embodiment 4.

FIG. 7 is a schematic cross-sectional drawing showing the configuration of the top part of an image forming apparatus according to Embodiment 4.

As shown in FIG. 7, in this image forming apparatus 700, top ejection platform 151 functioning as the printed sheet holding section thereof comprises a swinging member 701 that swings under its own weight and comes into contact with the top of a feed source document O placed on source document feed tray 141.

Swinging member 701 in this image forming apparatus 700 is composed of a source document pressing member 702 that presses the top of a feed source document O placed on source document feed tray 141, and a swinging arm 703 that supports source document pressing member 702 in a freely swinging manner so as to allow movement of source document pressing member 702 in the source document feeding direction during feed source document O feeding.

Figure 8:
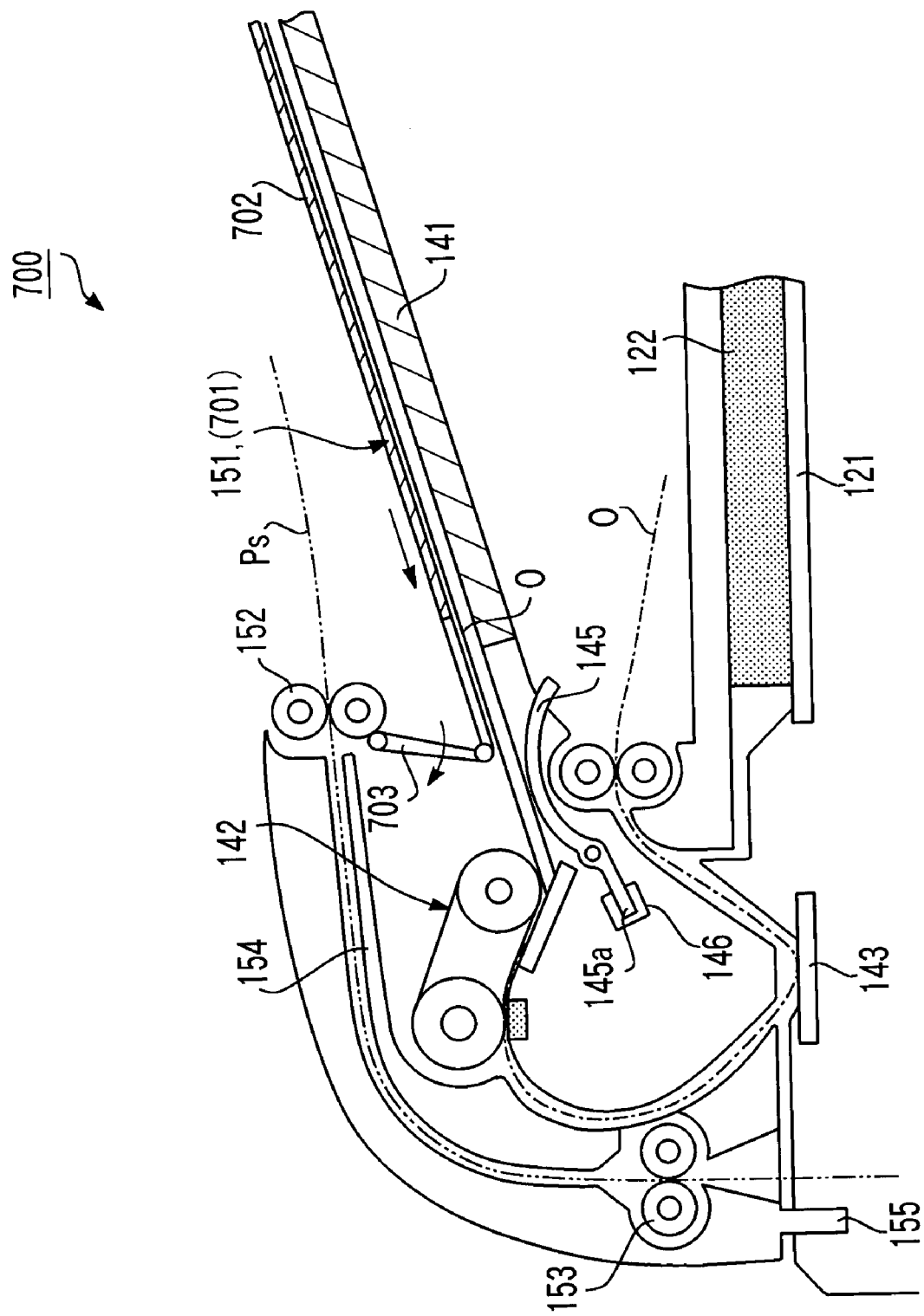
FIG. 8 is a schematic configuration diagram for explaining the behavior of the source document pressing member of an image forming apparatus according to Embodiment 4.

As shown in FIG. 8, with this image forming apparatus 700, the pressure of source document pressing member 702 on a feed source document O due to the weight of printed sheets Ps held by swinging member 701 can be reduced by movement of source document pressing member 702 in the source document feeding direction during feed source document O feeding.

Therefore, with this image forming apparatus 700, it is possible to prevent the occurrence of feed source document O feeding errors due to pressure of source document pressing member 702 on a feed source document O that increases as printed sheets Ps are ejected.

Other configuration elements and operations in image forming apparatus 700 of this example are similar to configuration elements and operations of image forming apparatus 100 according to Embodiment 1, and therefore descriptions thereof are omitted here.

Embodiment 5

Next, an image forming apparatus according to Embodiment 5 of the present invention will be described.

Figure 9:
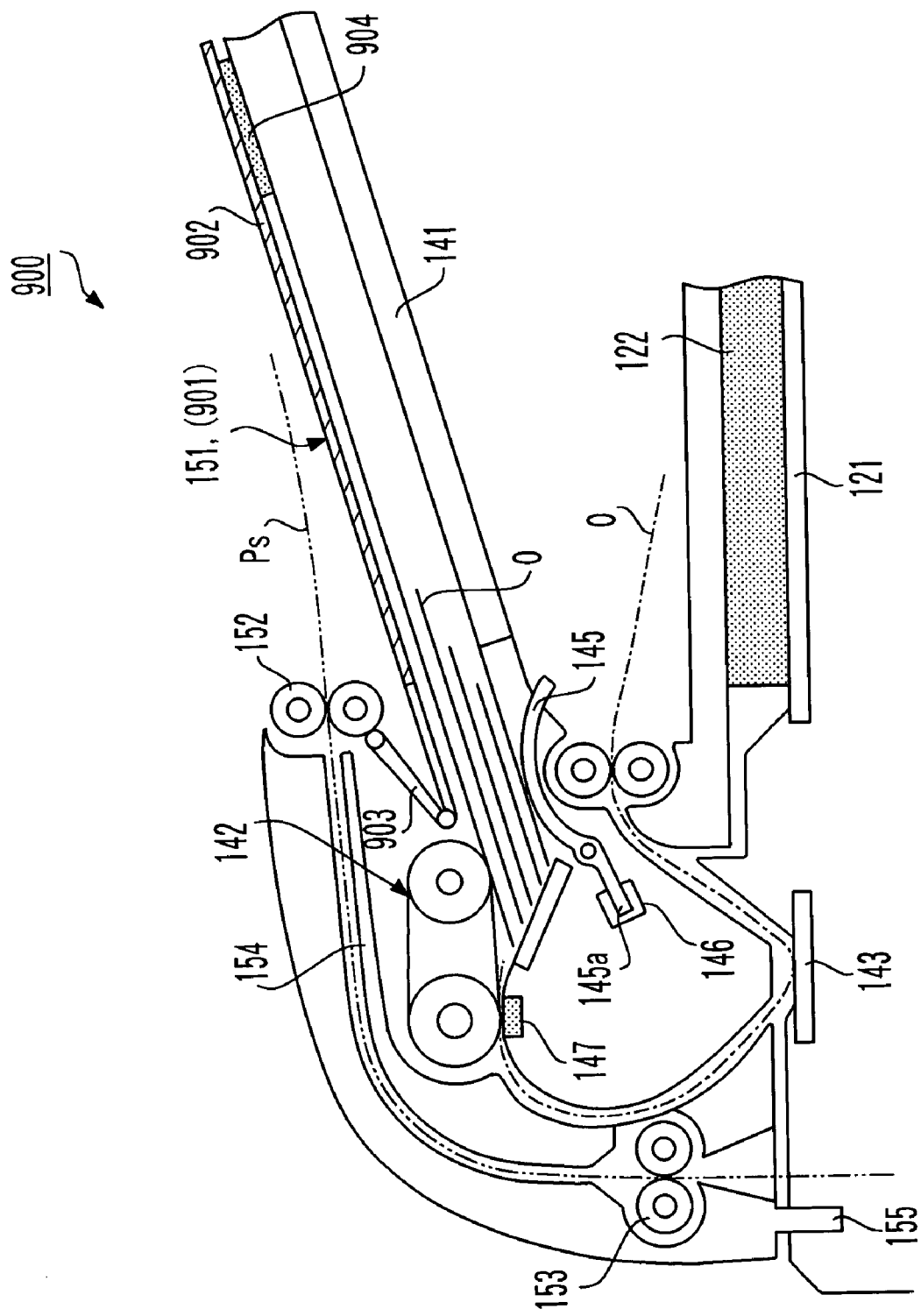
FIG. 9 is a schematic cross-sectional drawing showing the configuration of the top part of an image forming apparatus according to Embodiment 5.

FIG. 9 is a schematic cross-sectional drawing showing the configuration of the top part of an image forming apparatus according to Embodiment 5.

As shown in FIG. 9, this image forming apparatus 900 has a configuration whereby source document feed rollers 142 of the source document feeding section thereof perform feeding sequentially from the topmost feed source document O placed in source document feed tray 141.

Also, in this image forming apparatus 900, top ejection platform 151 functioning as the printed sheet holding section thereof comprises a swinging member 901 that swings under its own weight and comes into contact with the top of a feed source document O placed on source document feed tray 141.

In the same way as swinging member 701 of image forming apparatus 700 according to Embodiment 4, swinging member 901 is composed of a source document pressing member 902 that presses the top of a feed source document O placed on source document feed tray 141, and a swinging arm 903 that supports source document pressing member 902 in a freely swinging manner so as to allow movement of source document pressing member 902 in the source document feeding direction during feed source document O feeding.

Also, as shown in FIG. 9, in this image forming apparatus 900 according to Embodiment 5, source document pressing member 902 has a friction member 904 that comes into contact with the top of a feed source document O.

With this transmitting apparatus 900, when the topmost feed source document placed on source document feed tray 141 is fed by source document feed rollers 142 of the source document feeding section thereof, friction member 904 comes into contact with the top of feed source document O, enabling feed source document O multi-feeding to be prevented.

Therefore, with this image forming apparatus 900, it is possible to omit a sheet separation plate 147 (see FIG. 9) of a sheet separation section positioned so as to come into contact with a source document feed roller 142 of the source document feeding section, and simplification and cost reduction can be achieved for the source document feeding section.

Furthermore, with this transmitting apparatus 900, feed source document O multi-feeding can be prevented more surely by using a configuration whereby feed source documents O are separated through cooperation between sheet separation plate 147 of a sheet separation section provided in the source document feeding section and friction member 904.

Other configuration elements and operations in image forming apparatus 900 of this example are similar to configuration elements and operations of image forming apparatus 100 according to Embodiment 1, and therefore descriptions thereof are omitted here.

With image forming apparatuses 100, 500, 600, 700, and 900 according to the embodiments of the present invention, examples have been described in which an electrophotographic method is used as the image forming method of image forming section 130, but it goes without saying that that the present invention can also be applied to similar image forming apparatuses that use a different image forming method, such as an ink-jet method.

Also, for image forming apparatuses 100, 500, 600, 700, and 900 according to the embodiments of the present invention, multifunctional composite machines have been illustrated that have a copying function, print function, facsimile function, and so forth, but these image forming apparatuses may also have a single function.

An image forming apparatus according to the present invention enables a printed sheet that has undergone image formation to be ejected without obstruction above a source document feed tray of an automatic document feeder, and is therefore useful as an image forming apparatus comprising a copier, printer, or facsimile incorporating an automatic document feeder that performs automatic feeding of source documents, and a multifunctional composite apparatus that integrates these machines.

The present invention is not limited to the above-described embodiments, and various variations and modifications may be possible without departing from the scope of the present invention.

This application is based on Japanese Patent Application No. 2004-124750 filed on Apr. 20, 2004, the entire content of which is expressly incorporated by reference herein.

What is claimed is:

1. An image forming apparatus comprising:
    an automatic document feeder that is equipped with a source document feeding section that automatically feeds a source document and a source document feed tray on which a source document to be fed is set, that is positioned on a top part of the image forming apparatus main body, and that performs automatic feeding by means of the source document feeding section of a source document placed on the source document feed tray;
    an image forming section that forms an image on a sheet;
    a top ejection section that ejects above the source document feed tray a printed sheet on which an image has been formed by the image forming section;
    a printed sheet holding section that holds a source document feeding direction downstream edge of the printed sheet ejected above the source document feed tray in an area apart from the source document feeding section, wherein:
    the top ejection section ejects the printed sheet above the source document feed tray from a source document feeding direction downstream side; and
    the printed sheet holding section is composed of a swinging member whose free end swings freely under its own weight and comes into contact with a top of a source document placed in the source document feed tray.

2. The image forming apparatus according to claim 1, wherein the swinging member is composed of a source document pressing member that presses a top of a feed source document placed on the source document feed tray, and a swinging arm that supports the source document pressing member in a freely swinging manner so as to allow movement of the source document pressing member in a source document feeding direction during feeding of the feed source document.

3. The image forming apparatus according to claim 2, wherein:

the source document feeding section has a configuration whereby feeding is performed sequentially from a topmost feed source document placed on the source document feed tray; and the source document pressing member has a friction member that comes into contact with a top of the feed source document.

\* \* \* \* \*